(12) United States Patent
Liao et al.

(10) Patent No.: US 12,110,365 B2
(45) Date of Patent: Oct. 8, 2024

(54) METHOD FOR PRODUCING POLYPHENYLENE ETHER AMINE

(71) Applicant: NAN YA PLASTICS CORPORATION, Taipei (TW)

(72) Inventors: Te-Chao Liao, Taipei (TW); Jung-Jen Chuang, Taipei (TW); Chia-Ruey Tsai, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 213 days.

(21) Appl. No.: 17/739,212

(22) Filed: May 9, 2022

(65) Prior Publication Data

US 2023/0279181 A1    Sep. 7, 2023

(30) Foreign Application Priority Data

Mar. 2, 2022   (TW) .................. 111107602

(51) Int. Cl.
  *C08G 65/48*   (2006.01)
  *B01J 8/08*    (2006.01)
  (Continued)

(52) U.S. Cl.
  CPC ............ *C08G 65/485* (2013.01); *B01J 8/087* (2013.01); *B01J 8/10* (2013.01); *C08G 65/44* (2013.01);
  (Continued)

(58) Field of Classification Search
  None
  See application file for complete search history.

(56) References Cited

U.S. PATENT DOCUMENTS 10,611,711 B1 *  4/2020  Liao ................... B01J 23/462
2015/0141610 A1  5/2015  Fung et al.
(Continued)

FOREIGN PATENT DOCUMENTS

TW   200914491   4/2009
TW   201520243   6/2015
(Continued)

OTHER PUBLICATIONS

TWI628194b, 2018, Machine translation (Year: 2018).*
(Continued)

*Primary Examiner* — Satya B Sastri
(74) *Attorney, Agent, or Firm* — JCIPRNET

(57) ABSTRACT

A method for producing polyphenylene ether amine includes following steps. In step (a), a hydrogenation reaction tank is provided; a guided gas stirrer is disposed in the hydrogenation reaction tank. In step (b), a reaction solution is placed in the hydrogenation reaction tank, and the reaction solution is nitro polyphenylene ether dissolved in a solvent. In step (c), a hydrogenation catalyst is added to the reaction solution. In step (d), a hydrogen gas is introduced into the hydrogenation reaction tank. In step (e), the guided gas stirrer is activated. In step (f), a hydrogenation reaction is carried out on the conditions that a reaction temperature is 50-200 degrees Celsius and a reaction time is 1-20 hours, so as to hydrogenate the nitro polyphenylene ether in the reaction solution to polyphenylene ether amine. In step (g), the reaction solution is cooled down to a room temperature; the hydrogenation catalyst is removed.

6 Claims, 2 Drawing Sheets

(51) Int. Cl.
    *B01J 8/10*         (2006.01)
    *C08G 65/44*    (2006.01)

(52) U.S. Cl.
    CPC ............... *B01J 2208/00141* (2013.01); *B01J 2208/0015* (2013.01)

(56) References Cited

U.S. PATENT DOCUMENTS

| | | | |
|---|---|---|---|
| 2018/0346398 A1* | 12/2018 | Liao | ........................ B01J 23/462 |
| 2020/0172463 A1* | 6/2020 | Liao | ........................ B01J 19/18 |

FOREIGN PATENT DOCUMENTS

| | | | |
|---|---|---|---|
| TW | 201636392 | | 10/2016 |
| TW | I628194 B | * | 7/2018 |
| TW | 201912661 | | 4/2019 |

OTHER PUBLICATIONS

"Office Action of Taiwan Counterpart Application", issued on Oct. 7, 2022, p. 1-p. 5.
"Office Action of Japan Counterpart Application", issued on Jul. 11, 2023, p. 1-p. 4.

\* cited by examiner

METHOD FOR PRODUCING POLYPHENYLENE ETHER AMINE

CROSS-REFERENCE TO RELATED APPLICATION

This application claims the priority benefit of Taiwan patent application serial no. 111107602, filed on Mar. 2, 2022. The entirety of the above-mentioned patent application is hereby incorporated by reference herein and made a part of this specification.

BACKGROUND

Technical Field

The disclosure relates to a method for producing polyphenylene ether amine; more particularly, the disclosure relates to a method for producing polyphenylene ether amine based on a hydrogenation reaction.

Description of Related Art

Polyphenylene ether amine is an off-white solid mainly applied in circuit boards, antennas, and aviation fields. Therefore, how to effectively produce the polyphenylene ether amine has become one of the research topics.

SUMMARY

The disclosure provides a method for producing polyphenylene ether amine, whereby yield may be improved and/or economic efficiency may be increased to a greater extent.

In an embodiment of the disclosure, a method for producing polyphenylene ether amine includes following steps. In step (a), a hydrogenation reaction tank is provided, and a guided gas stirrer adapted to perform gas extracting, gas exhausting, and stirring functions is disposed in the hydrogenation reaction tank. The guided gas stirrer includes a hollow rotation shaft and a vane disposed at an end of the hollow rotation shaft, and the hollow rotation shaft has a gas extracting hole and a gas exhausting hole. In step (b), a reaction solution is placed in the hydrogenation reaction tank, and the reaction solution is nitro polyphenylene ether dissolved in a solvent. In step (c), a hydrogenation catalyst is added to the reaction solution, a usage amount of the hydrogenation catalyst is 0.2-15 weight percentage of the nitro polyphenylene ether. In step (d), a hydrogen gas is introduced into the hydrogenation reaction tank, so that a hydrogen pressure in the hydrogenation reaction tank is 10-120 bars. In step (e), the guided gas stirrer is activated, so that the hollow rotation shaft in the guided gas stirrer reaches a predetermined rotation speed to drive the vane to stir the reaction solution. Here, the hollow rotation shaft introduces the hydrogen gas from a top of the reaction solution through the gas extracting hole of the hollow rotation shaft and transmits the hydrogen gas into the reaction solution through the gas exhausting hole of the hollow rotation shaft, and the hydrogen gas in the reaction solution is stirred by the vane and evenly distributed. In step (f), a hydrogenation reaction is carried out, wherein a reaction temperature is 50-200 degrees Celsius, and a reaction time is 1-20 hours to hydrogenate the nitro polyphenylene ether in the reaction solution to the polyphenylene ether amine. In step (g), the reaction solution is cooled down to a room temperature, and the hydrogenation catalyst is removed.

According to an embodiment of the disclosure, in the step (c), the usage amount of the hydrogenation catalyst is 0.5-10 weight percentage of the nitro polyphenylene ether.

According to an embodiment of the disclosure, the hydrogenation catalyst is a ruthenium (Ru) catalyst, a palladium (Pd) catalyst, a rhodium (Rh) catalyst, a platinum (Pt) catalyst, a nickel (Ni) catalyst, or any combination thereof.

According to an embodiment of the disclosure, in the step (d), the hydrogenation reaction tank has an internal hydrogen pressure of 10-120 bars after the hydrogen gas is introduced.

According to an embodiment of the disclosure, in the step (e), the predetermined rotation speed reached by the hollow rotation shaft and the vane is 1200-1500 rpm.

According to an embodiment of the disclosure, in the step (f), the reaction temperature at which the hydrogenation reaction is carried out is 70-180 degrees Celsius.

According to an embodiment of the disclosure, a heat exchange plate or a coil is further disposed in the hydrogenation reaction tank.

In view of the above, in the method for producing the polyphenylene ether amine by carrying out the hydrogenation reaction to hydrogenate the nitro polyphenylene ether as provided in one or more embodiments of the disclosure, the guided gas stirrer adapted to perform the gas extracting function, the gas exhausting, and the stirring function may be applied in a hydrogenation reactor, so as to improve the yield of the polyphenylene ether amine and/or increase the economic efficiency to a greater extent.

To make the above more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

The following specific embodiments of the disclosure are provided to explain an implementation manner of a "method for producing polyphenylene ether amine". People skilled in the pertinent art may understand the advantages and effects provided in the disclosure from the contents disclosed in this specification. The claimed method may be implemented or applied according to other different specific embodiments, and various details in this specification may also be modified and changed based on different viewpoints and applications without departing from the concept and scope of the disclosure. In addition, the accompanying drawings are merely illustrative and are not made according to the actual size. The following embodiments further describe the related technical contents of the disclosure in detail, but the disclosed contents are not intended to limit the scope of protection defined herein.

Unless there is a specific basis of certain descriptions or terms, the order of explanation of each step does not represent the order of actual execution. In addition, when a step (or another similar term) is referred to as being "after another step", such a step may be performed directly after the another step, or there may be one or more intervening steps between the step and the another step.

The term "or" used in the disclosure may include a combination of any one or more of the relevant items.

The terms "about," "approximately," or other similar terms used in the disclosure may refer to an average value of the stated value and particular values within a deviation range acceptable to people skilled in the pertinent art, considering all specific measurement quantities, measurement-related quantities, manufacturing quantities, and the number of measurement-related errors.

Figure 1:
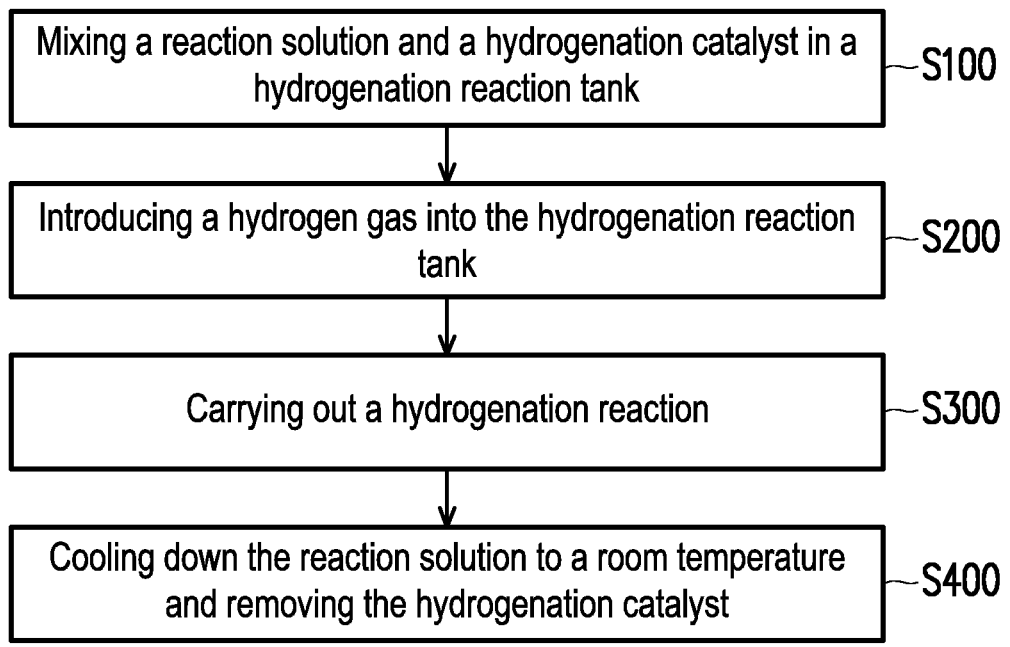
FIG. 1 is a flowchart of some steps of a method for producing polyphenylene ether amine according to an embodiment of the disclosure.

With reference to FIG. 1, a method for producing polyphenylene ether amine is provided in an embodiment of the disclosure; in the method, nitro polyphenylene ether is applied to prepare the polyphenylene ether amine, and the method mainly includes following steps. In step S100, a hydrogenation reaction tank is provided, and a guided gas stirrer is disposed in the hydrogenation reaction tank; a reaction solution is placed in the hydrogenation reaction tank, and a hydrogenation catalyst is placed in the hydrogenation reaction tank. Thereby, the reaction solution and the hydrogenation catalyst may be mixed in the hydrogenation reaction tank. In step S200, a hydrogen gas is introduced into the hydrogenation reaction tank. In step S300, a hydrogenation reaction is carried out. In step S400, after the hydrogenation reaction, the reaction solution is cooled down to a room temperature, and the hydrogenation catalyst is removed.

Figure 2:
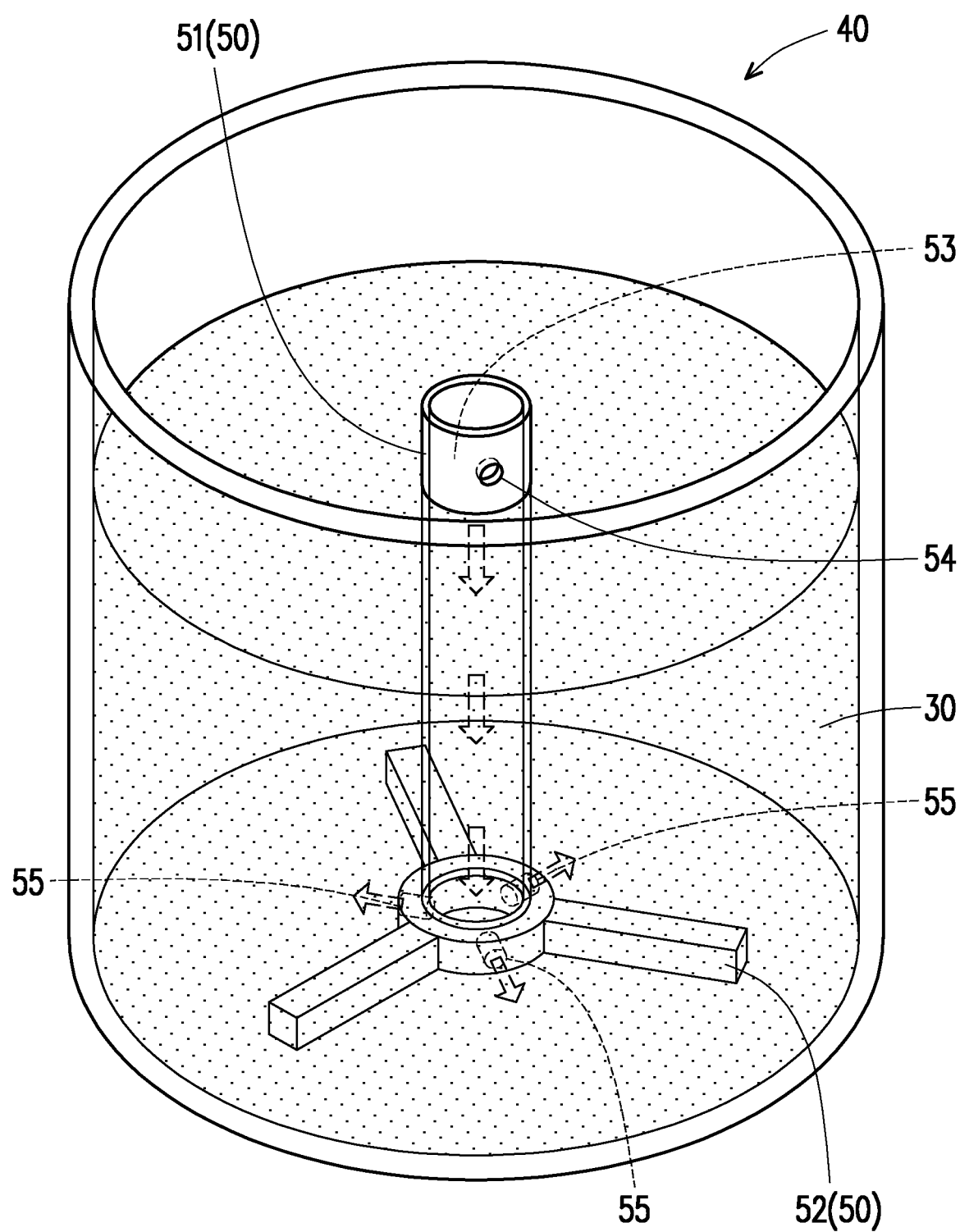
FIG. 2 is a schematic three-dimensional view of a portion of a hydrogenation reaction tank according to an embodiment of the disclosure.

With reference to FIG. 2, a hydrogenation reaction tank 40 provided in step 100 may serve to hydrogenate nitro polyphenylene ether to generate the polyphenylene ether amine. A guided gas stirrer 50 is disposed in the hydrogenation reaction tank 40. The guided gas stirrer 50 is capable of performing gas extracting, gas exhausting, and stirring functions, so as to increase the contact efficiency between a hydrogen gas and a reaction solution 30 and improve the yield of the polyphenylene ether amine.

Particularly, the hydrogenation reaction tank 40 may be a barrel-shaped pressure-resistant container, and a ratio of the height to the diameter of the hydrogenation reaction tank 40 preferably ranges from 0.4 to 3. In addition to the guided gas stirrer 50, a heat guiding apparatus may be further disposed in the hydrogenation reaction tank 40. The heat guiding apparatus is able to quickly exhaust the heat generated by the hydrogenation reaction to reduce a heat accumulation speed. The heat guiding apparatus is, for instance, a commonly known heat exchange plate or a commonly known coil (not shown in the drawings), which should however not be construed as a limitation in the disclosure.

The guided gas stirrer 50 includes a hollow rotation shaft 51 and a vane 52 disposed at an end of the hollow rotation shaft 51. A gas channel 53 is formed inside the hollow rotation shaft 51. The gas channel 53 is adapted for the hydrogen gas to be transmitted. At least one gas extracting hole 54 communicating with the gas channel 53 is arranged at an upper end of the hollow rotation shaft 51. During the hydrogenation reaction or the like, the gas extracting hole 54 is located above a top 31 of the reaction solution 30 (e.g., the reaction solution reacting with nitro polyphenylene ether) and serves to guide the hydrogen gas into the gas channel 53. At least one gas exhausting hole 55 communicating with the gas channel 53 is arranged at a lower end of the hollow rotation shaft 51 and serves to discharge the hydrogen gas entering the gas channel 53. The vane 52 of the guided gas stirrer 50 may be a flat vane, a curved vane, or a concave vane. In addition, for better understanding, the approximate flow direction of the hydrogen gas is schematically indicated by an arrow depicted by dotted lines in FIG. 2.

In step S100, the reaction solution 30 may be poured into the hydrogenation reaction tank 40. The reaction solution 30 includes nitro polyphenylene ether and a solvent suitable for dissolving the nitro polyphenylene ether.

In step S100, the hydrogenation catalyst serves to promote the hydrogenation reaction of the nitro polyphenylene ether. The hydrogenation catalyst may be a heterogeneous catalyst, which may be a Ru catalyst, a Pd catalyst, a Rh catalyst, a Pt catalyst, a Ni catalyst, or any combination thereof. Considering the speed and cost of hydrogenation, the usage amount of the hydrogenation catalyst may be about 0.2-15 weight percentage (wt %) of the nitro polyphenylene ether, preferably about 0.5-10 wt % of the nitro polyphenylene ether.

In step S100, note that the order of adding the reaction solution 30 and the hydrogenation catalyst to the hydrogenation reaction tank 40 is not limited. Based on the uniformity of the reaction, the reaction solution 30 may be added to the hydrogenation reaction tank 40, and then the hydrogenation catalyst may be added to the hydrogenation reaction tank 40.

In step S200, after the hydrogen gas is introduced into the hydrogenation reaction tank 40, a hydrogen pressure inside the hydrogenation reaction tank 40 may be about 10-120 bars, preferably about 10-100 bars.

In step S300, the hollow rotation shaft 51 of the guided gas stirrer 50 may reach the predetermined rotation speed to drive the vane 51 to stir the reaction solution 30. The predetermined rotation speed may be about 1200-1500 rpm. At this time, the hydrogen gas above the top 31 of the reaction solution 30 is extracted from the gas extracting hole 54, guided into the gas channel 53, discharged from the gas exhausting hole 55 to the reaction solution 30, and stirred by the vane 52 and evenly distributed. Thereby, the contact efficiency between the hydrogen gas and the reaction solution 30 may be improved, so that the concentration of the hydrogen dissolved in the reaction solution 30 may be increased; as such, the hydrogenation catalyst may have higher activity and/or the efficiency of the hydrogenation reaction may be improved.

In step S300, the reaction temperature of the hydrogenation reaction may be about 50-200 degrees Celsius, preferably about 70-180 degrees Celsius, and the reaction time may be about 1-20 hours, so as to hydrogenate the nitro polyphenylene ether in the reaction solution 30 to polyphenylene ether amine. When the guided gas stirrer 50 and the heat exchange plate or the coil is arranged in the hydrogenation reaction tank 40, note that the yield of the polyphenylene ether amine may be increased, which may result from the increase in the contact efficiency between the hydrogen gas and the reaction solution 30 in the hydrogenation reaction tank 40 and the timely dissipation of heat generated by the hydrogenation reaction.

In step S400, after the hydrogenation reaction is completed, the reaction solution 30 is cooled down to a room temperature, and the hydrogenation catalyst is filtered out, so as to obtain a resultant solution containing the polyphenylene ether amine. The composition of the reaction product includes about 95 wt % of the polyphenylene ether amine solution and a small amount of impurities, wherein the yield of the polyphenylene ether amine may arrive at about 95 wt % or higher.

In an embodiment, the nitro polyphenylene ether may be represented by the following [Formula 1]:

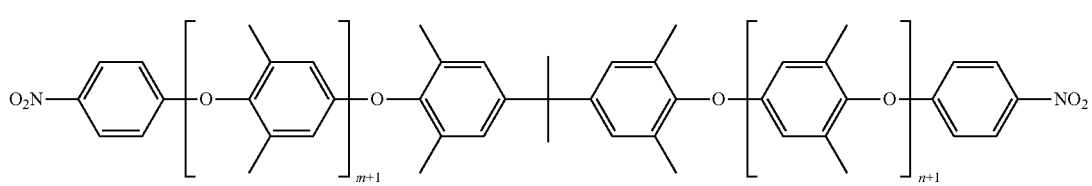

[Formula 1]

In an embodiment, the polyphenylene ether amine produced by the method described above with use of the nitro polyphenylene ether may be represented by the following [Formula 2]:

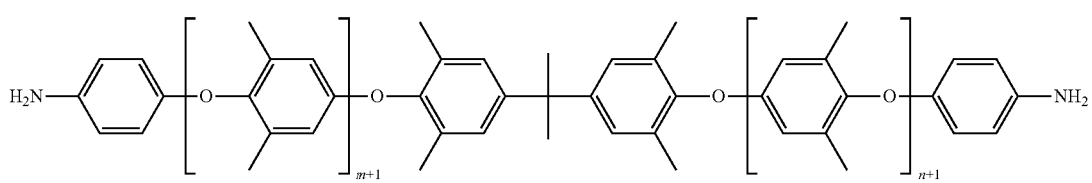

[Formula 2]

In [Formula 1] and [Formula 2], m and n are integers greater than or equal to 0, and m and n may be the same or different. In an embodiment, m or n is less than or equal to 10.

In an embodiment, solvents suitable for dissolving the nitro polyphenylene ether may include but are not limited to alcohols (e.g., methanol, ethanol, isopropanol), aromatics (e.g., toluene, xylene), dimethylacetamide, butanone, or a combination thereof.

Detailed descriptions are provided hereinafter with reference to the following embodiments and comparative examples, which is merely exemplary and should not be construed as a limitation to the scope of protection provided in the disclosure.

Embodiment 1

250 grams (g) of the solution containing nitro polyphenylene ether are introduced into a pressure resistant reaction tank which has the volume of about 0.45 liter is equipped with a guided gas stirrer (which may be the same or similar to the hydrogenation reaction tank 40 shown in FIG. 2), about 0.66 g of a Pd catalyst is added, about 100 bars of a hydrogen gas is added, and a constant pressure is maintained inside the pressure resistant reaction tank. Next, the guided gas stirrer of the reaction tank is activated, the temperature is raised to about 90 degrees Celsius, and the reaction is carried out at about 90 degrees Celsius for about 6 hours. After the reaction is completed, the reaction solution is cooled down to the room temperature. After the catalyst is filtered out, the composition of the reaction product is analyzed, and the results are shown in Table 1. The yield of polyphenylene ether amine is about 95%.

Embodiment 2

The preparation method provided herein is the same as that provided in [Embodiment 1], except that the reaction pressure is changed to about 40 bars, and the reaction time is changed to about 8 hours. The other conditions stay the same, and the results are shown in Table 1. The yield of polyphenylene ether amine is about 95%.

Embodiment 3

The preparation method provided herein is the same as that provided in [Embodiment 1], except that the reaction pressure is changed to about 20 bars, and the reaction time is changed to about 10 hours. The other conditions stay the same, and the results are shown in Table 1. The yield of polyphenylene ether amine is about 95%.

Embodiment 4

The preparation method provided herein is the same as that provided in [Embodiment 1], except that the reaction pressure is changed to about 18 bars, and the reaction time is changed to about 10 hours. The other conditions stay the same, and the results are shown in Table 1. The yield of polyphenylene ether amine is about 95%.

Embodiment 5

The preparation method provided herein is the same as that provided in [Embodiment 1], except that the reaction pressure is changed to about 15 bars, and the reaction temperature is changed to about 110 degrees Celsius. The other conditions stay the same, and the results are shown in Table 1. The yield of polyphenylene ether amine is about 94%.

Comparative Example 1

The guided gas stirrer in the reaction tank is replaced by a vane wheel stirrer not capable of performing the gas extracting function and the gas exhausting function, while the other conditions stay the same as those in [Embodiment 1]. The results are shown in Table 1. The yield of polyphenylene ether amine is about 83%.

Comparative Example 2

The reaction pressure is changed to about 40 bars, and reaction time is changed to about 8 hours. The other conditions stay the same as those in [Comparative Example 1], and the results are shown in Table 1. The yield of polyphenylene ether amine is about 82%.

Comparative Example 3

The reaction pressure is changed to about 20 bars, and the reaction time is changed to about 10 hours. The other conditions stay the same as those in [Comparative Example 1], and the results are shown in Table 1. The yield of polyphenylene ether amine is about 81%.

Comparative Example 4

The reaction pressure is changed to about 18 bars, and the reaction time is changed to about 10 hours. The other conditions stay the same as those in [Comparative Example 1], and the results are shown in Table 1. The yield of polyphenylene ether amine is about 80%.

Comparative Example 5

The reaction pressure is changed to about 15 bars, and the reaction temperature is changed to about 110 degrees Celsius. The other conditions stay the same as those in [Comparative Example 1], and the results are shown in Table 1. The yield of polyphenylene ether amine is about 80%.

The operation conditions and corresponding yields generated according to [Embodiment 1] to [Embodiment 5] and [Comparative Example 1] to [Comparative Example 5] are shown in [Table 1]. Considering the specific measurement quantities, measurement-related quantities, manufacturing quantities, and the number of measurement-related errors, each numerical value represented in [Table 1] may reasonably encompass the average value of such numerical value and particular values within a deviation range acceptable to people skilled in the pertinent art.

TABLE 1

|  | Embodiment | | | | | Comparative Example | | | | |
| --- | --- | --- | --- | --- | --- | --- | --- | --- | --- | --- |
|  | 1 | 2 | 3 | 4 | 5 | 1 | 2 | 3 | 4 | 5 |
| Hydrogenation reaction tank | Using a guided gas stirrer | | | | | Using a vane wheel stirrer | | | | |
| Nitro polyphenylene ether solution (g) | 250 | 250 | 250 | 250 | 250 | 250 | 250 | 250 | 250 | 250 |
| Pd catalyst (g) | 0.66 | 0.66 | 0.66 | 0.66 | 0.66 | 0.66 | 0.66 | 0.66 | 0.66 | 0.66 |
| Hydrogen pressure (bar) | 100 | 40 | 20 | 18 | 15 | 100 | 40 | 20 | 18 | 15 |
| Reaction temperature (° C.) | 90 | 90 | 90 | 90 | 110 | 90 | 90 | 90 | 90 | 110 |
| Reaction time (hr) | 6 | 8 | 10 | 10 | 6 | 6 | 8 | 10 | 10 | 6 |
| Yield of polyphenylene ether amine (%) | 95 | 95 | 95 | 95 | 94 | 83 | 82 | 81 | 80 | 80 |

As shown by the results in [Table 1], in the method for producing polyphenylene ether amine according to one or more embodiments of the disclosure, the guided gas stirrer adapted to perform the gas extracting function, the gas exhausting, and the stirring function is applied in the hydrogenation reactor, which may achieve at least one of following effects: (1) improving the contact efficiency between the hydrogen gas and the reaction solution; (2) allowing the hydrogenation catalyst to have extremely high activity and fast hydrogenation reaction speed because the reaction solution applied for hydrogenation contains the dissolved hydrogen with high concentration; and/or (3) ensuring economic efficiency because performing the hydrogenation reaction may obtain the polyphenylene ether amine with high yield.

The content disclosed above is only the preferable and feasible embodiments of the disclosure and is not intended to limit the scope of protection provided in the disclosure. Therefore, any equivalent technical modification made with reference to the description and drawings provided in the disclosure is encompassed in the scope of protection or its equivalents as provided in the disclosure.

To sum up, in the method for producing the polyphenylene ether amine by carrying out the hydrogenation reaction to hydrogenate the nitro polyphenylene ether as provided in one or more embodiments of the disclosure, the guided gas stirrer adapted to perform the gas extracting function, the gas exhausting, and the stirring function may be applied in the hydrogenation reactor, so as to improve the yield of the polyphenylene ether amine and/or increase the economic efficiency to a greater extent.

It will be apparent to those skilled in the art that various modifications and variations may be made to the disclosed embodiments without departing from the scope or spirit of the disclosure. In view of the foregoing, it is intended that the disclosure covers modifications and variations provided they fall within the scope of the following claims and their equivalents.

What is claimed is:

1. A method for producing polyphenylene ether amine, the method comprising following steps:
   step (a): providing a hydrogenation reaction tank with a guided gas stirrer adapted to perform gas extracting, gas exhausting, and stirring functions, wherein the guided gas stirrer comprises a hollow rotation shaft and a vane disposed at an end of the hollow rotation shaft, and the hollow rotation shaft has a gas extracting hole and a gas exhausting hole;
   step (b): placing a reaction solution in the hydrogenation reaction tank, wherein the reaction solution is nitro polyphenylene ether dissolved in a solvent;

step (c): adding a hydrogenation catalyst to the reaction solution, wherein a usage amount of the hydrogenation catalyst is 0.2-15 weight percentage of the nitro polyphenylene ether;

step (d): introducing a hydrogen gas into the hydrogenation reaction tank, so that a hydrogen pressure in the hydrogenation reaction tank is 10-120 bars;

step (e): activating the guided gas stirrer, so that the hollow rotation shaft in the guided gas stirrer reaches a predetermined rotation speed to drive the vane to stir the reaction solution, wherein the hollow rotation shaft introduces the hydrogen gas from a top of the reaction solution through the gas extracting hole of the hollow rotation shaft and transmits the hydrogen gas into the reaction solution through the gas exhausting hole of the hollow rotation shaft, and the hydrogen gas in the reaction solution is stirred by the vane and evenly distributed;

step (f): carrying out a hydrogenation reaction, wherein a reaction temperature is 50-200 degrees Celsius, and a reaction time is 1-20 hours to hydrogenate the nitro polyphenylene ether in the reaction solution to the polyphenylene ether amine; and step (g): cooling down the reaction solution to a room temperature and removing the hydrogenation catalyst, wherein the hydrogenation catalyst comprises a palladium catalyst.

2. The method for producing the polyphenylene ether amine according to claim 1, wherein in the step (c), the usage amount of the hydrogenation catalyst is 0.5-10 weight percentage of the nitro polyphenylene ether.

3. The method for producing the polyphenylene ether amine according to claim 1, wherein in the step (d), the hydrogenation reaction tank has an internal hydrogen pressure of 10-120 bars after the hydrogen gas is introduced.

4. The method for producing the polyphenylene ether amine according to claim 1, wherein in the step (e), the predetermined rotation speed reached by the hollow rotation shaft and the vane is 1200-1500 rpm.

5. The method for producing the polyphenylene ether amine according to claim 1, wherein in the step (f), the reaction temperature at which the hydrogenation reaction is carried out is 70-180 degrees Celsius.

6. The method for producing the polyphenylene ether amine according to claim 1, wherein a heat exchange plate or a coil is further disposed in the hydrogenation reaction tank.

* * * * *